(12) United States Patent
Giannopoulos

(10) Patent No.: US 6,504,267 B1
(45) Date of Patent: Jan. 7, 2003

(54) FLYBACK POWER CONVERTER WITH SECONDARY-SIDE CONTROL AND PRIMARY-SIDE SOFT SWITCHING

(75) Inventor: Demetri Giannopoulos, Norwalk, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/017,346

(22) Filed: Dec. 14, 2001

(51) Int. Cl.[7] .................................................. H02J 1/00
(52) U.S. Cl. ...................................................... 307/31
(58) Field of Search ................................ 307/11, 31, 39, 307/33

(56) References Cited

U.S. PATENT DOCUMENTS 5,617,015 A    4/1997  Goder et al. ................. 323/282
6,339,262 B1 *  1/2002  Igarashi et al. ............... 307/31

FOREIGN PATENT DOCUMENTS

EP          0772284 A2    5/1995
EP          0698959 A1    2/1996

* cited by examiner

Primary Examiner—Shawn Riley
(74) Attorney, Agent, or Firm—Edward W. Goodman

(57) ABSTRACT

A flyback power converter is described which provides multiple independently regulated outputs. Zero-volt primary side switching is achieved at a resonance minimum which occurs at the end of each energy cycle between a primary side capacitor and an isolation transformer primary winding.

5 Claims, 6 Drawing Sheets

US 6,504,267 B1

FLYBACK POWER CONVERTER WITH SECONDARY-SIDE CONTROL AND PRIMARY-SIDE SOFT SWITCHING

BACKGROUND OF THE INVENTION

1. Technical Field of the Invention

The present invention relates in general, to power conversion and, more specifically, to a multiple output flyback converter, having improved cross-regulation and soft-switching to eliminate switching losses in the converter.

2. Description of the Related Art

Power converters are widely used to provide required voltages and load currents especially in environments that have higher concentrations of telecommunications or computer equipment. These power converters are often required to provide higher levels of output power for a small physical volume, since space is often at a premium. This requirement dictates that the power converters be high power density devices. These higher power density concentrations also dictate that the power converter operate with as high an efficiency as possible to minimize the converter's heat generation and therefore its operating temperature rise to the degree possible.

Through the use of switching regulator techniques, power converter efficiencies may be achieved that are typically higher than those of linear regulation techniques. These switching regulator techniques, however, give rise to other efficiency-decreasing problems that are not typically encountered in linear regulators. Because of higher switching frequencies (50 to 100 kilohertz), parasitic circuit inductance and capacitance elements in the transformers and switching devices cause "ringing" due to circuit resonances. This ringing typically presents both device and efficiency problems that must be addressed to operate the converters at high power densities.

One prior-art method for increasing power density of dc-to-dc converters, particularly in applications where more than one output voltage is required, is to use a single power stage with multiple windings on the power transformer, one for each output voltage. In such a converter, all outputs share the same inverter stage, and only one output, called the main output, is fully regulated by pulse-width modulation of the inverter switches on the primary side. Such a solution then requires feedback isolation, and additional post-regulators are required for independent regulation of the auxiliary outputs against load variation.

The flyback converter is a very popular power supply topology for use in low-power, multiple output applications. When the main output voltage regulation requirement is moderate, these converters may be operated with the main output being regulated by the switching regulator and the other output (s) being "cross-regulated", i.e., the ratio of the output voltages on the different windings is determined by the winding ratio and the actual relative voltage levels are determined by the 'on' time of the main switch. Cross-regulation of each output voltage is achieved by the turns ratio of the secondary windings.

FIG. 1 illustrates a prior art flyback converter that uses a single switch on the primary side of the transformer to directly regulate one of the output voltage, i.e., Va, using feedback control. The cross-regulation of the other output voltages, i.e., Vb and Vc, is achieved by the turns ratio of the secondary winding. A drawback of the flyback converter of FIG. 1 is the presence of parasitics which result in wide tolerances for the cross-regulated outputs, which do not satisfy strict regulation requirements. Post-regulators (e.g., linear regulators) are sometimes used to improve the regulation of the output voltages. However, this approach increases cost and reduces efficiency of the power supply. A secondary side control method has been proposed as a solution to this shortcoming.

European patent No. 0 698 959 discloses one secondary-side control method which includes switches on the secondary-side of the transformer to provide independently regulated outputs. FIG. 2 illustrates a flyback converter where a rectifying diode is connected in series with each secondary winding. The corresponding regulator RS1 of the first output circuit controls the regulator (RS0) of the primary-side circuit. Output regulators RS2, RS3, control the secondary-side switches S2, S3 correspondingly. The input DC voltage Vin, a voltage representation of the primary-side switch S0 and one output of the regulators RS2, RS3 are also fed to the primary-side regulator RS0.

EP 0 772 284 discloses another secondary-side control method where one secondary winding supplies multiple output voltages via separate branches as shown in FIG. 3. Each output voltage is rectified by means of a diode. The first output V1 is regulated by the pulse width of the primary-sie switch S0. A switch is inserted into each branch supplying the rest of the output voltages (V2, V3). A regulator senses each of the output voltages V2, V3. The regulator controls the duty cycle of the corresponding switch to regulate the output voltage.

U.S. Pat. No. 5,617,015 to Goder et al., discloses a voltage regulator providing multiple independently regulated outputs. FIG. 4 illustrates a boost topology circuit configuration disclosed in Goder. However, it is disclosed that voltage-regulator may be implemented with a flyback or other topologies. A dedicated switch to each output voltage controls the energy delivery to the output. Energy is delivered to only those outputs that have fallen below the lower limit of an acceptable range. The voltage regulator will stop supplying the outputs that have exceeded the upper limit of an acceptable range.

European patents Nos. 0 698 959 and 0 772 284 and U.S. Pat. No. 5,617,015 to Goder each recite control of the on/off state of the primary-side switch based on the values of the output voltages. While each resolve the problem of primary side control of one of the outputs, they share a common drawback. Specifically, the secondary side control methods disclosed by each result in hard switching of the primary-side switch thus increasing switching losses and thereby reducing the efficiency of the power converter.

A further drawback associated with the circuits of FIG. 2 and 3 is that one of the output voltages has no secondary-side switch dedicated to its regulation. Instead, the output includes a rectifying diode and is regulated by the primary side switch. This is problematic in reduced power modes of operation (e.g., standby) where it is desirable to disable some of the outputs. This cannot be achieved with the circuit configurations of FIGS. 2 and 3 because the output which does not include the secondary-side switch cannot be disabled without disabling all of the outputs.

A still further drawback associated with the circuit of FIG. 4 is that the regulation method described therein increases the peak output current resulting in increased ripple compared with methods that continuously provide current to the multiple outputs.

In order to solve problems associated with parasitics which result in wide tolerances for the cross-regulated outputs, an objective of this invention is to make the converter insensitive to these parasitic effects by providing secondary-side control.

A related objective of the present invention is to enable soft-switching of the primary side switch by taking advantage of the method of secondary-side control.

SUMMARY OF THE INVENTION

To address the above-discussed deficiencies of the prior art, the present invention provides, a circuit which combines secondary-side regulation with primary-side zero-volt switching to achieve a level of circuit efficiency and flexibility not available in prior art circuit constructions.

The novel circuit provides circuit efficiency by providing zero-volt switching of the primary side switch. Zero-volt switching is achieved by taking advantage of a resonance which occurs between a switch capacitor coupled in parallel with a primary side power switch and a magnetization inductance of a primary side winding. A primary side controller detects the resonance condition and switches the power switch at one of the resonant waveform minima.

The novel circuit further provides flexibility via secondary-side regulation. In particular, the circuit provides means for independently and selectively disabling one or more output channels of the converter by providing a secondary side switch in each of a plurality of output circuits. An output circuit or channel can be selectively disabled, via the switch, by blocking the secondary winding current from flowing into the selected output.

In an embodiment to be illustrated and described, the isolation power converter is a flyback isolation converter including a power transformer, a power switch on the primary side and a secondary side including three output channels connected to a single secondary winding, where the first two output channels switched in each energy cycle are regulated on the secondary side and the last output channel to be switched in each energy cycle is controlled from the primary side. Primary-side control of the last output to be switched in the sequence is effected by an error signal which is transmitted from the secondary-side, via an opto-coupler, to a pulse-width modulator on the primary side for controlling the duty cycle of the power switch on the primary side. While separate voltage controlled switches are include in each output channel, the switch associated with the final output channel to be sequenced is subsidiary to the primary side power switch. However, separate switches are included in each output channel to selectively disable one or more of the output channels by blocking the secondary winding current from flowing into the disabled output(s).

The present invention introduces, in another aspect, a circuit capable of effecting substantially zero-volt switching of a power switch of the primary switching circuit in the primary side switch to increase the efficiency of the power converter.

In an embodiment to be illustrated and described, the primary and secondary side switches are metal oxide semiconductor field-effect transistor switches (MOSFETs). Those skilled in the pertinent art will understand, however, that the present invention fully encompasses all controllable switches, whether conventional or later-developed. An external diode may be employed as required to supplement the internal body diode of the clamping switch. Of course, an external diode may be employed if the clamping switch does not include a body diode.

In one embodiment of the present invention, the converter is selected from the group consisting of a flyback converter, a forward converter and a half-bridge converter. Those skilled in the pertinent art understand, however, that other isolated converter topologies are well within the broad scope of the present invention.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
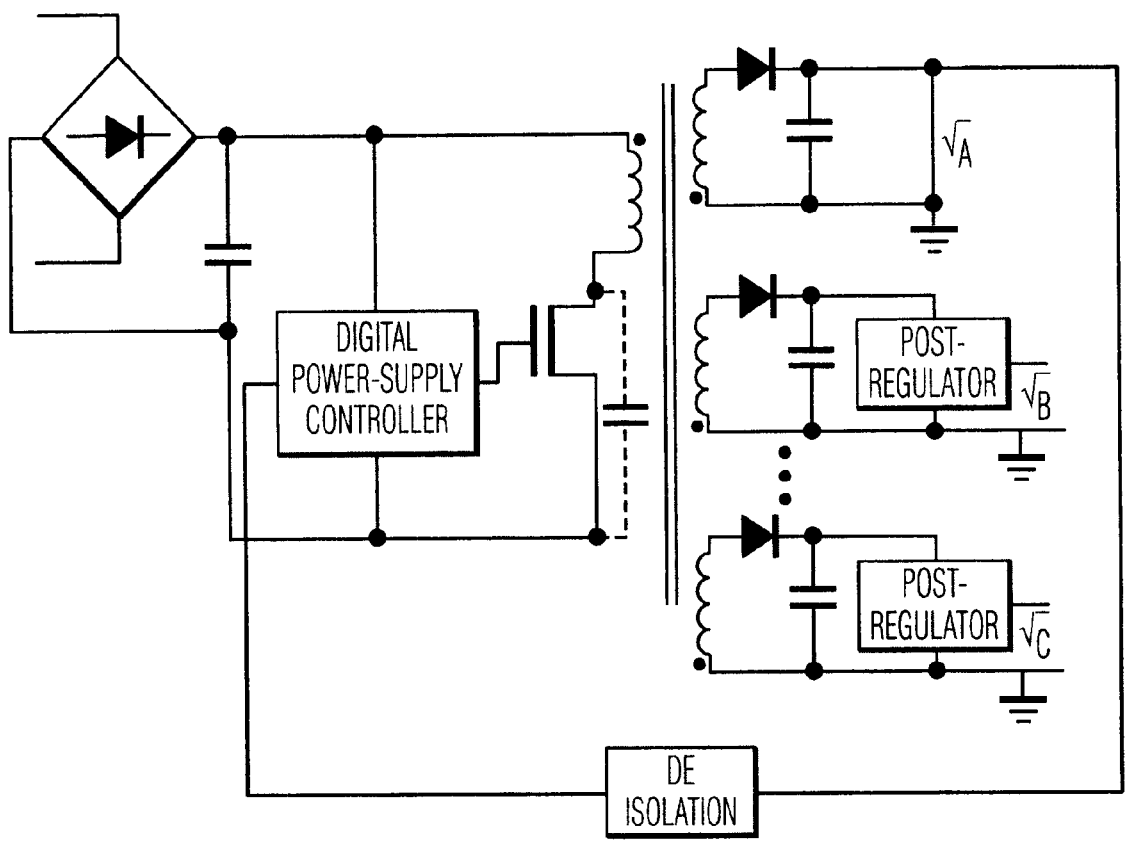
FIG. 1 is a circuit diagram illustrating a conventional flyback converter that uses a single switch on the primary side of the transformer to directly regulate one of the output voltages.
Figure 2:
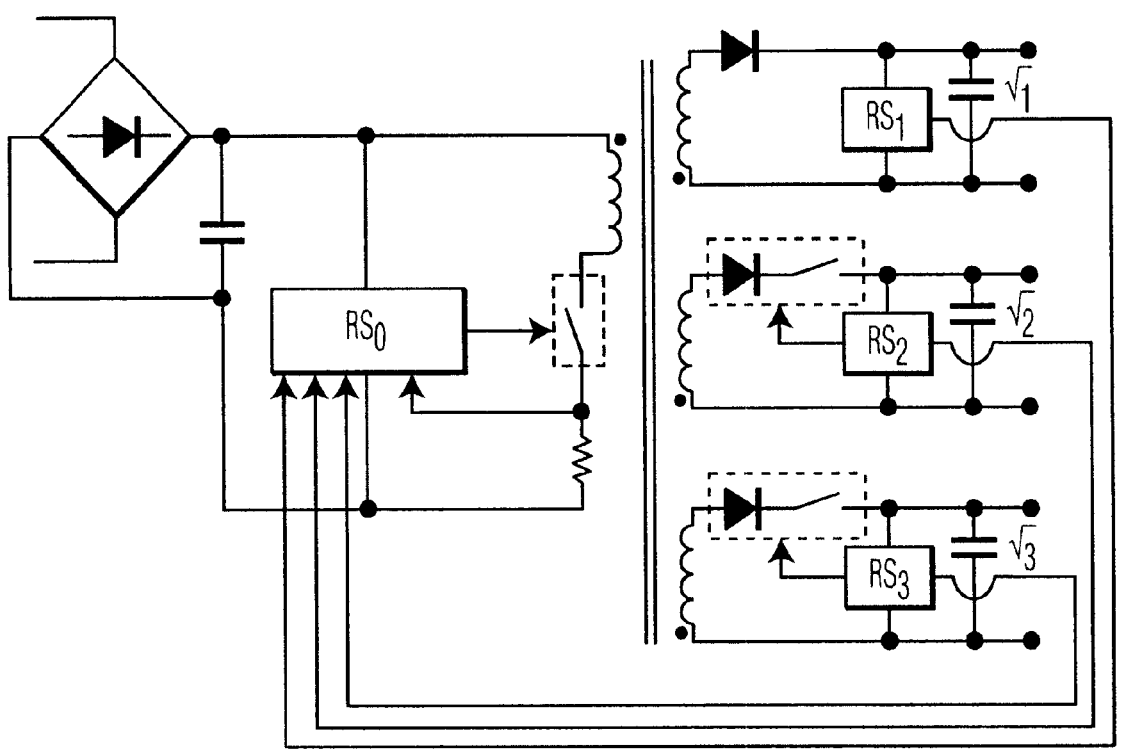
FIG. 2 is a circuit diagram illustrating a conventional flyback converter which illustrates one secondary-side control method according to the prior art.
Figure 3:
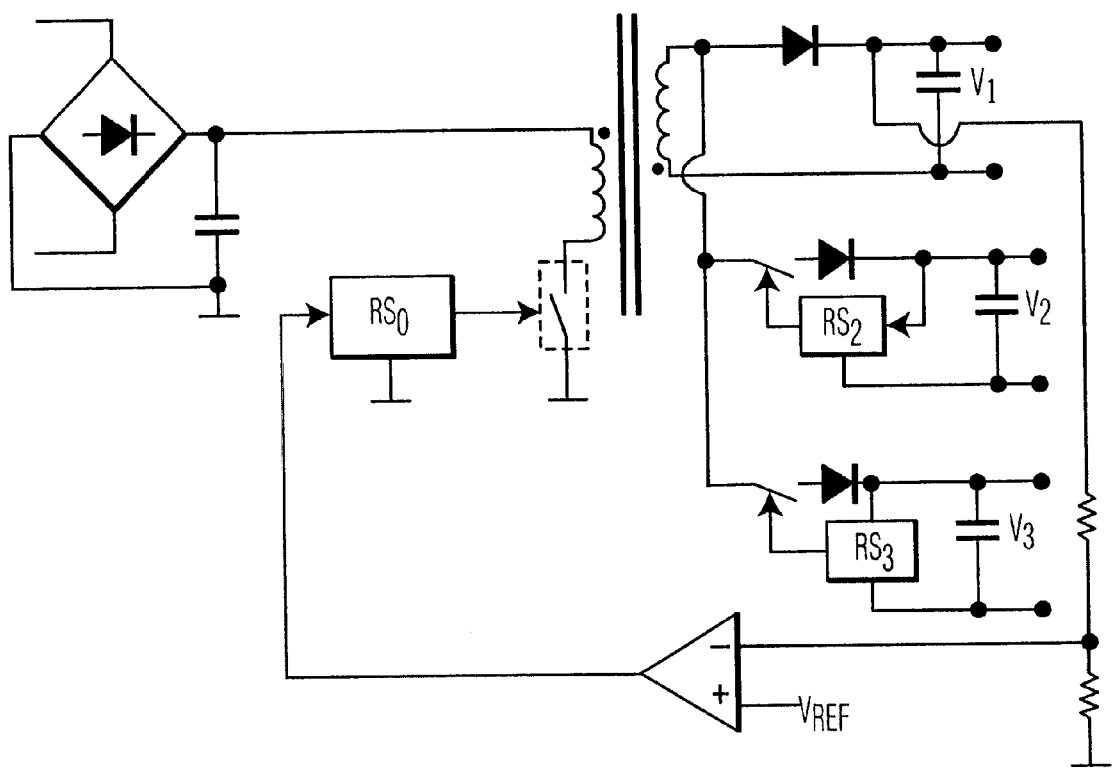
FIG. 3 is a circuit diagram illustrating a conventional flyback converter which illustrates another secondary-side control method according to the prior art.
Figure 4:
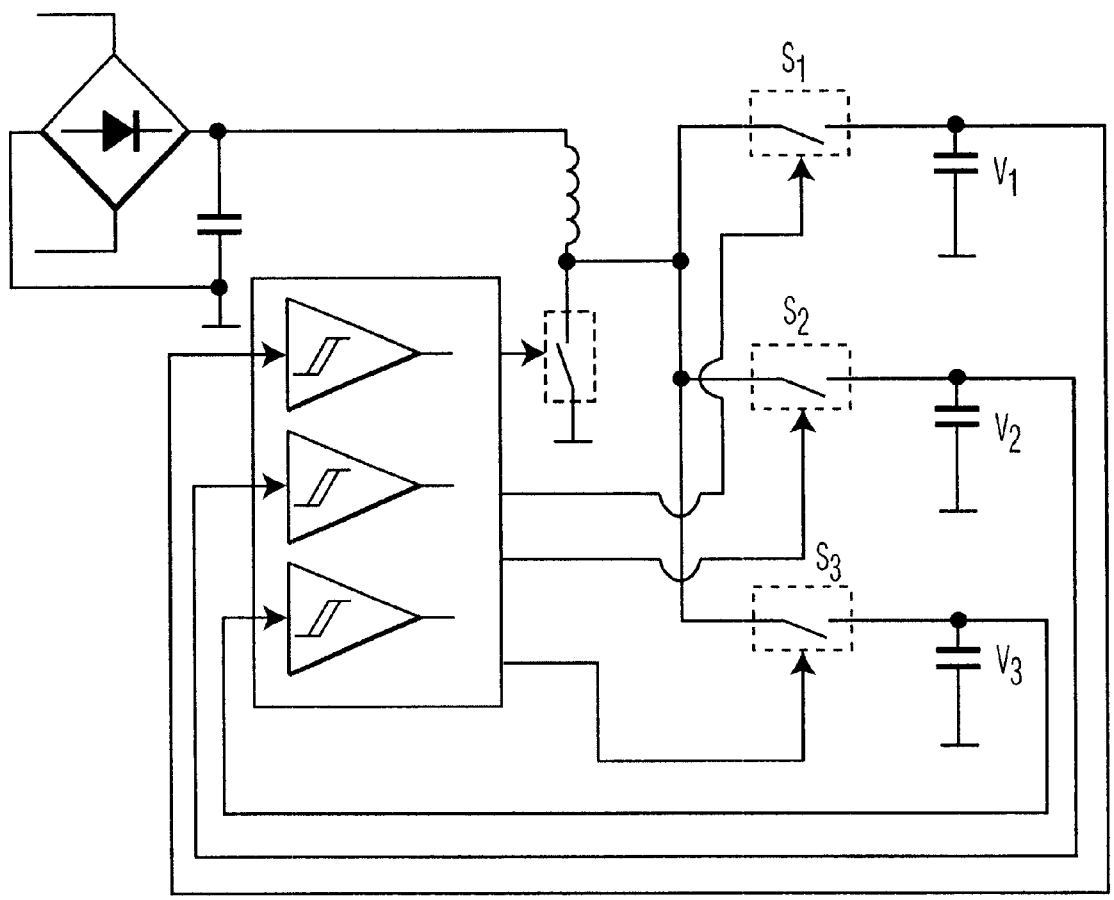
FIG.4 is a circuit diagram illustrating a dedicated switch in each output according to the prior art.
Figure 5:
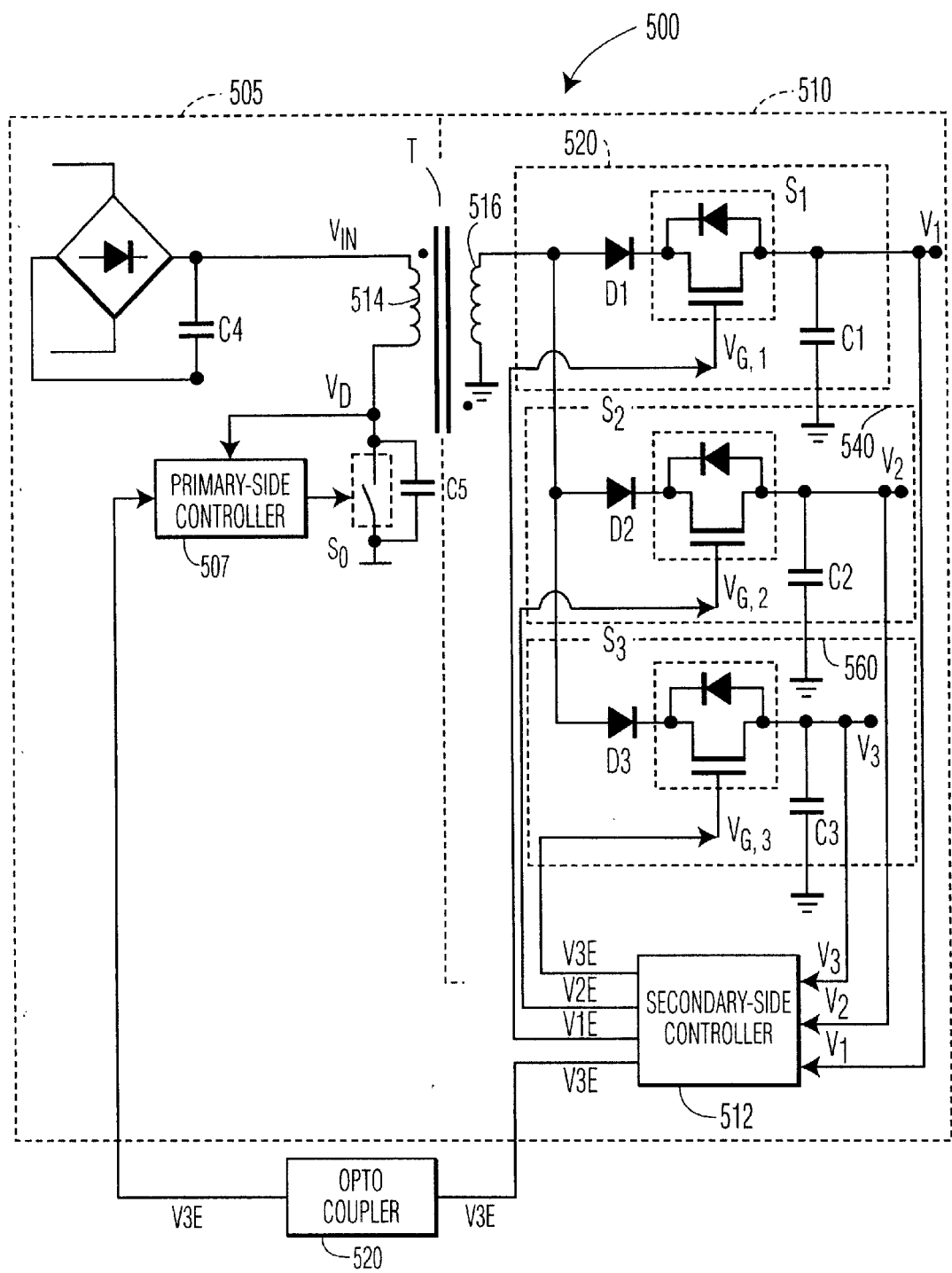
FIG. 5 illustrates a circuit diagram of a soft-switching multiple-output flyback converter in accordance with the present invention.

Referring to FIG. 5, a schematic diagram of an exemplary embodiment of the present flyback converter circuit is illustrated, and is generally identified by the numeral 500. Converter 500 includes a primary circuit 505, a regulated output circuit 510 and an opto-coupler 520. Optical coupler 520 operates to electrically isolate and optically couple feedback information from the regulated output circuit 510. The primary circuit 505, includes a primary winding 514 of a transformer T coupled to a power switch $S_0$, a rectified input voltage, $V_{in}$ and a primary-side controller 507. When the power switch $S_0$ conducts, a transformer current flows through the primary winding 514 and stores energy in the magnetic field of the transformer T. When the power switch is non-conductive, the energy stored in the magnetic field is transferred to the secondary winding 516 to develop two or more DC output voltages.

The regulated output circuit 510, coupled to the secondary winding 516 of the transformer T, includes three output channels in the exemplary embodiment. A first output channel 520 is coupled to the secondary winding 516 of the transformer T and to a first output $V_1$. The first channel includes a diode D1, a switch $S_1$ and a capacitor C1. A second output channel 540 is coupled to the secondary winding 516 of the transformer T and to a second output $V_2$. The second channel includes a diode D2, a switch $S_2$ and a capacitor C2. A third output channel 560 is coupled to the secondary winding 516 of the transformer T and to a third output $V_3$. The third output includes a diode D3, a switch $S_3$ and a capacitor C3. Capacitors C1, C2 and C3 connect the respective outputs $V_1$, $V_2$ and $V_3$ to the ground of the return line to stabilize the output voltages by absorbing high frequency ripple current. Diodes D1, D2 and D3 prevent current flow back into the secondary winding. Preferably, each of switches $S_1$, $S_2$ and $S_3$ comprise a MOSFET, the anti-parallel rectifier comprising a body diode of the MOSFET. Of course, other types of switches, including bipolar junction transistors (BJTs), are well within the broad scope of the present invention.

Drive control for switches S1, S2 and S3 is provided by a secondary-side controller 512 which receives as input, output voltages $V_1$, $V_2$ and $V_3$ and processes the respective output signals to generate corresponding output error signals $V_{1E}$, $V_{2E}$ and $V_{3E}$ to drive pulse width modulation (PWM) circuitry in the secondary-side controller 512 to drives switches $S_1$, $S_2$ and $S_3$ to maintain a regulated output voltage.

The regulation scheme shown in FIG. 5 is commonly called secondary side regulation because switches are used on the secondary side of the transformer to regulate the output voltages.

The power converter 500 further includes a primary-side controller 507. The primary-side controller 507 performs two essential functions to effect zero-voltage switching of the primary side switch. First, the controller 507 monitors the drain voltage $V_d$ of transformer T to turn on the primary side switch at a voltage minimum of the drain voltage $V_d$ waveform. Second, at the point in time at which the primary side switch is turned on, the controller 507 utilizes the secondary side output error signal corresponding to the output channel sequenced last in the energy cycle to adjust the relative duty cycle of the primary side power switch $S_0$.

In the exemplary circuit of FIG. 5, the output channels are sequenced in the following first to last order: output channel 520, 540 and 560. Accordingly, error signal $V_{3E}$ corresponding to the third output channel 560 is continuously fed back from the secondary-side controller 512, via the opto-coupler 520, to the primary-side controller 507 to adjust the relative duty cycle of the power switch $S_0$ at a point in time when switch $S_0$ is turned on.

Further, it will be apparent to one of ordinary skill in the art that the circuit of the present invention could have a different number of output circuits than that shown in the exemplary circuit of FIG. 5 without altering the basic circuit principles and mode of operation.

Circuit Operation

Operation of the inventive circuit 500 of FIG. 5 may be more readily understood with reference to the idealized switching circuit waveforms of FIG. 6 for one charge/discharge cycle as defined by the time interval A to F. FIGS. 6a–d illustrate the open and closed states of the switches $\{S_0, S_1, S_2$ and $S_3\}$ during the charge/discharge cycle and FIG. 6e illustrates the drain voltage $V_d$ of the bottom of the primary side winding 514 of the transformer T for this time interval. The configuration of the switches $S_0$, $S_1$, $S_2$ and $S_3$, in the present invention determines whether the circuit is in the charge or discharge phase of the cycle.

Charging Phase

During the charge phase of the cycle, $T_{charge}$, (i.e., time period A to B), the rectified input voltage from the main power source, $V_{in}$, charges transformer T. All of the switches $\{S_1, S_2$ and $S_3\}$ are in the open state, except for the switch $S_0$ (see FIG. 6a). Once the transformer T is sufficiently charged, the switch $S_0$ is opened at time B. In actual operation, the first switch in the switching sequence, e.g., switch $S_1$, is usually turned on somewhat ahead of the primary switch $S_0$ being turned off. In general, there may often be some overlap between the 'on' and 'off' times off the sequential controlled switches. This occurs for two reasons, first, the flyback converter should not be left "unloaded", and secondly, soft-switching can sometimes be achieved with some overlap.

Discharge Phase

During the discharge phase, $T_{discharge}$, of the energy cycle (i.e., time period B to E), only one switch is in a closed state at any given time (e.g., $S_1$ or $S_2$ or $S_3$) so that the load coupled to the closed switch will receive the maximum charge from the transformer T. Each secondary side switch is closed for a time sufficient to perform voltage regulation. Specifically, voltage regulation is performed on the secondary side utilizing the secondary controller 512 by coordinating and implementing the time duration for the open and closed states for the secondary side switches by feeding back an error signal from the secondary-side controller 512 to be applied to the gates of the secondary side switches. It is noted, however, that the secondary side control is not effected for the output channel to be sequenced last in each charge/discharge cycle. The last output channel is controlled from the primary side, as will be described. It is further noted that any of the output channels could be sequenced last in the energy cycle sequencing order.

The discharge phase of the energy cycle is now described in detail.

Figure 6A:
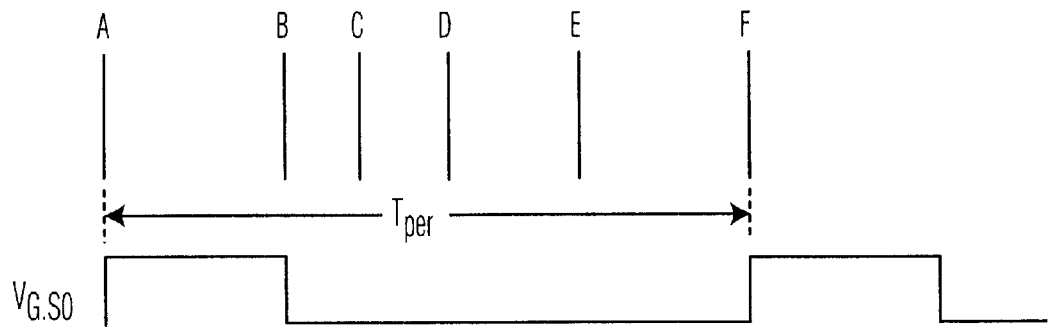
FIGS. 6A–6E illustrate idealized waveforms during a switching period of the soft-switched multiple-output flyback converter of FIG. 5.
Figure 6B:

For the time period B to C, the switch S1 remains closed (see FIG. 6b). Initially, at time period B, there is an overshoot in the drain voltage (see FIG. 6e) due to the leakage inductance of the primary side. The drain voltage eventually settles down to a level equal to the sum of the input voltage plus the reflected voltage of voltage V1, the output of channel 520. That is the drain voltage $V_d$, equals $(V_{r1}+V_{IN})$.

For the time period C to D, the switch S2 is in a closed state (see FIG. 6c) and the switch S1 is in an open state (see FIG. 6b). During this time, the drain voltage $V_d$ is equal to the sum of the input voltage plus the reflected voltage of the second output channel voltage $V_2$. That is, the drain voltage $V_d$ equals $(V_{r2}+V_{IN})$.

Figure 6C:
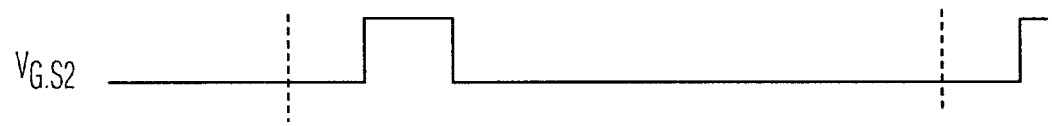
Figure 6D:
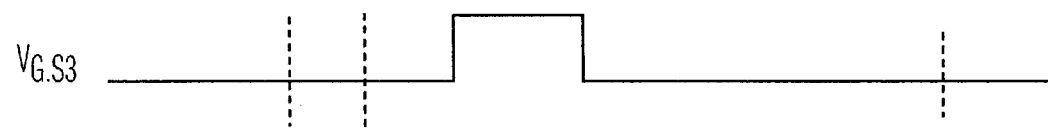

For the time period D to E, the switch S3 is in a closed state (see FIG. 6d) and the switch S2 is in an open state (see FIG. 6c). During this time, the drain voltage $V_d$ is equal to the sum of the input voltage plus the reflected voltage of the third output channel voltage $V_3$. That is, the drain voltage $V_d$ equals $(V_{r3}+V_{IN})$.

Time period E marks the end of the demagnetization sub-phase $T_{demag}$ and the start of the resonance sub-phase $T_{res}$. The significance of this demarcation will now be described.

Figure 6E:
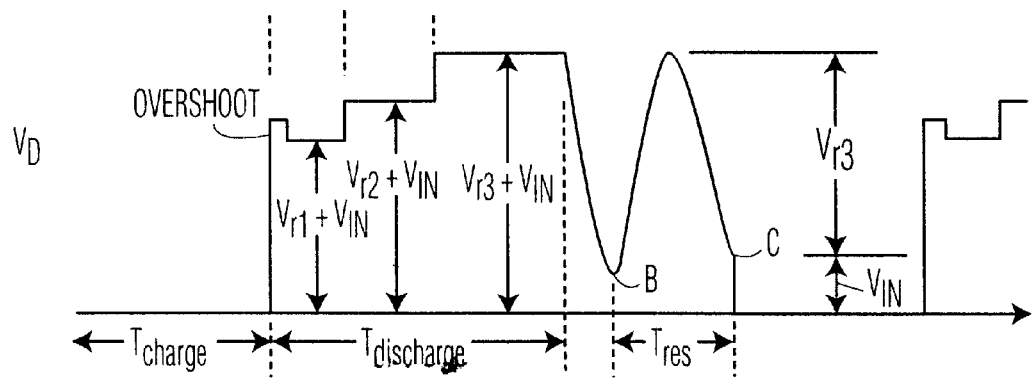

At time period E, which marks the demarcation point between the two sub-phases, discharge and resonance, switch S3 transitions from a closed to an open state. At time period E occurs at a point in time at which the secondary-side current becomes substantially zero. One way of determining a substantially zero secondary-side current is with a monitoring circuit. The zero current condition occurs as a result of the transformer T becoming demagnetized, i.e., no stored energy is left in the transformer for the present energy cycle. Accordingly, at point E, there is no longer a reflected voltage on the primary side. This situation causes a resonance condition (see FIG. 6e) between capacitor C5 and the magnetizing inductance of the primary winding 14 of transformer T1. The resonance condition is used to perform soft-switching of the primary-side switch. Soft-switching of the primary switch, $S_0$, is achieved via the primary controller 507 by detecting the resonance condition (see FIG. 6e) and determining one of the minima of the resonance to turn on switch S0. Referring to FIG. 6e, points B and C denote resonance minima.

It is further noted that the amplitude of the resonant waveform of FIG. 6e is determined by the magnitude of the reflected voltage of the last output to be switched in the energy cycle. In the illustrative circuit, the amplitude of the waveform of FIG. 6e is determined by the reflected voltage, $V_{r3}$. It is further noted that if the reflected voltage (e.g., $V_{r3}$) is large enough, the minima of the waveform can approach zero volts.

Although the invention has been described with a certain degree of particularity, various modifications may be made to the embodiments disclosed herein. It is, therefore, to be understood that the above description should not be construed as limiting, but merely as an exemplification of the various embodiments.

What is claimed is:

1. A flyback power converter comprising a primary side and a secondary side:

said primary side comprising:
  a power switch and a primary winding of a power transformer connected in a series combination, the series combination connected in parallel across first and second input supply nodes;
  an input capacitor connected in parallel across the first and second input supply nodes; and
  a switch capacitor connected in parallel across said power switch; said secondary side comprising:
  a secondary winding of the power transformer connected in parallel across a first and a secondary side node;
  multiple output circuits wherein each of said multiple output circuits include a rectifier, a switch and an output capacitor wherein said rectifier is connected in series between the first secondary side node and said switch, and said output capacitor is connected in parallel across a first output node;
  means for performing secondary-side regulation of at least one output from said multiple output circuits; and
  wherein a zero voltage switching condition of said power switch occurs at a resonance minimum of a resonant condition between said primary side winding and said switch capacitor.

2. The flyback converter of claim 1, further comprising a primary side controller operable to detect said resonance minimum and cause the power switch to be turned on when the voltage across the power switch is substantially equal to zero volts.

3. The flyback converter of claim 2, wherein said primary controller includes a first input for receiving a drain voltage of said primary side winding to detect said resonance condition.

4. The flyback converter of claim 3, wherein said primary controller further includes a second input for receiving a secondary side signal for controlling a duty cycle of said power switch.

5. The flyback converter of claim 1, wherein the power switch is selected from the group consisting of a FET device, an insulated gate bipolar transistor device.

* * * * *